United States Patent
Shepherd et al.

(10) Patent No.: US 7,338,615 B2
(45) Date of Patent: Mar. 4, 2008

(54) DIELECTRIC MEDIA

(75) Inventors: Terence J Shepherd, Malvern (GB); Paul R Tapster, Malvern (GB)

(73) Assignee: Qinetiq Limited, London (GB)

( * ) Notice: Subject to any disclaimer, the term of this patent is extended or adjusted under 35 U.S.C. 154(b) by 621 days.

(21) Appl. No.: 10/373,863

(22) Filed: Feb. 27, 2003

(65) Prior Publication Data

US 2003/0151033 A1  Aug. 14, 2003

Related U.S. Application Data

(62) Division of application No. 09/254,881, filed as application No. PCT/GB97/02723 on Oct. 6, 1997, now Pat. No. 6,547,982.

(30) Foreign Application Priority Data

Oct. 9, 1996 (GB) ................................ 9621049.7

(51) Int. Cl.
C04B 35/00 (2006.01)
H01L 29/12 (2006.01)

(52) U.S. Cl. .......................... 252/62.3 R; 252/62.3 Q; 385/131; 331/94.1

(58) Field of Classification Search ........... 252/62.3 R, 252/62.3 Q; 385/131; 331/94.1
See application file for complete search history.

(56) References Cited

U.S. PATENT DOCUMENTS 3,668,574 A * 6/1972 Barlow ........................ 333/240
5,172,267 A 12/1992 Yablonovitch
5,245,466 A 9/1993 Burns et al.
5,385,114 A 1/1995 Milstein et al.
5,471,180 A * 11/1995 Brommer et al. ........... 333/202
5,505,871 A * 4/1996 Harder ....................... 252/78.3

FOREIGN PATENT DOCUMENTS

| GB | 2222314 A | * | 2/1990 |
| WO | 92 00185 | | 1/1992 |
| WO | 92 15124 A | | 9/1992 |
| WO | 94 15389 | | 7/1994 |
| WO | 96 42036 A | | 12/1996 |

* cited by examiner

Primary Examiner—Cephia D. Toomer
(74) Attorney, Agent, or Firm—Nixon & Vanderhye P.C.

(57) ABSTRACT

A novel method of fabrication of periodic dielectric composites involving a flexible computer design stage, rapid growth of a second dielectric component. Laser stereolithography is used to form the polymer material layer by layer by photopolymerisation of a liquid. Certain materials constructed in this fashion exhibit a complete loss-free barrier to microwave propagation through the material for a desired band of frequencies and are commonly known as photonic band gap crystals. Such materials could provide a novel medium for all-angle wide- and narrow-band blocking filters, narrow-band transmission filters, reflective and loss-free substrates for planar antennas, and novel loss-free media for oscillator cavities and waveguides. In addition a novel crystal structure, particularly suited to the fabrication method mentioned above and consisting of concatenated polyhedrons, is revealed.

12 Claims, 4 Drawing Sheets

DIELECTRIC MEDIA

This application is a Divisional of application Ser. No. 09/254,881, filed Mar. 16, 1999, (now U.S. Pat. No. 6,547, 982) which is the US national phase of International Application PCT/GB97/02723 filed in English on Oct. 6, 1997, which designated the US. PCT/GB97/02723 claims priority to GB Application No. 9621049.7 filed Oct. 9, 1996. The entire contents of these applications are hereby incorporated by reference.

BACKGROUND OF THE INVENTION

1. Field of the Invention

The current invention relates to a method of fabricating a dielectric medium comprising two materials with discrete interfaces between the two and media so formed.

2. Discussion of Prior Art

Electronic band structure is a familiar concept to most physicists and electrical engineers: within a crystalline material the band structure describes the ranges of energies accessible to electrons travelling within the material under the influence of an applied electric field. Of particular interest in such materials is the "electronic band gap"—a range of energies within which propagation through the crystal is forbidden to electrons possessing such energies. The gap arises from destructive interference of the electronic wavefunctions Bragg-reflected from crystal planes formed from the periodic arrangement of constituent atoms or molecules within the crystal. The gap is instrumental in explaining such macroscopic phenomena as thermal and electrical conductivity, and is exploited in the design of semiconductors and hence electronic devices.

Yablonovitch [1] and John [2] suggested that similar principles should apply to the electromagnetic (EM) field propagating through periodic media—that is to say that a spatially periodic distribution of electrical permittivity could give rise to a "photonic band gap", which is a range of frequencies for which EM propagation is forbidden in any direction within the periodic medium. Such a material is known as a "photonic crystal". The word "photonic" implies an association with phenomena in the optical and near-infrared regions of the EM spectrum, and, indeed, this was the application region intended by Yablonovitch and others. The principle of the phenomenon, however, extends over the whole EM spectrum and although the specific examples presented herein relate to the microwave region, nothing in this specification should be construed as limiting the scope of the invention to that or any other region.

The face-centred-cubic (FCC) crystal lattice was initially suggested by both Yablonovitch and John as the best structure in which to observe the photonic band gap. It possesses the most nearly spherical Brillouin zone of all the 14 Bravais lattices, and is thus the most likely to possess a full (i.e. extending over all $4\pi$ steradians) and absolute (i.e. applying to both EM polarisations) band gap. The complete description of the full crystal structure requires specification of the basis (the content of the unit cell) as a dielectric distribution function in space.

Yablonovitch et al [3] were able to demonstrate the existence of a full and absolute photonic band gap at microwave frequencies. They successfully exhibited the effect in an FCC crystal formed by drilling into a proprietary homogeneous high-permittivity and lossless material—Stycast Hi-K™. This material, manufactured by Emerson and Cuming (now part of W. R. Grace) is a composite comprising a low-permittivity polymer (polystyrene) and a high-permittivity powdered filler (titanium dioxide). It is available commercially in a range of dielectric loading, with permittivities from 3 to 30. Yablonovitch chose a permittivity of 12 (closest to 13.6, the dielectric constant of GaAs at optical frequencies). His structure was fabricated by drilling out three circularly cylindrical voids through each point on a hexagonal arrangement of points on the surface of the polymer. Each cylinder was angled at 34.26° from the vertical, with the three voids arranged at 120° azimuthally from each other. The surface holes were separated by 11 mm and had a radius of 0.5 mm. This drilling process produced a structure in which the cylindrical voids intersected within the material to form an FCC crystal with a single axis of symmetry in the [111] direction. The structure was 78% empty. It is a patented structure [3a] and has been dubbed "Yablonovite" [4a].

Yablonovitch [3] also suggested another structure involving the drilling of a further 3 sets of holes in planes perpendicular to the [111] direction. This latter structure possesses full 6-fold diamond symmetry and has proved impractical to fabricate using drilling methods. It has been predicted to have a broader band gap than the 3-cylinder structure [4b].

The 3-cylinder material has been shown by Yablonovitch [3] to suppress propagation to the level of 9 dB per crystal layer. In the [110] direction a 6-layer crystal exhibited a 50 dB attenuation over a frequency gap in the transmission spectrum over a width of 20% of the centre frequency, 15 GHz. More importantly, when defects in the crystal structure were introduced by breaking internal dielectric bridges, a narrow transmission peak appeared in the centre of the gap [5].

An alternative structure for the fabrication of 3-dimensional photonic crystals is described in refs. 5a, 5b, and 5c. This consists of a layer-by-layer arrangement of spaced dielectric rods, usually of rectangular cross-section. The utility of this system is that the structure can be fabricated by stacking wafers of one-dimensional etched gratings.

Each of these structures is of a very specific type, and is associated with a specific method of fabrication. In fact, there exists an infinity of structures which can, in principle, give rise to the photonic band gap phenomenon. It is possible that one of these structures will possess better physical properties (ie. in terms of width of gap for a given dielectric contrast of constituent materials) than these. It is thus valuable to have a general method of construction of photonic crystal.

The suppression of propagation within the material renders a block of the crystal effectively reflective to all incident radiation within the bandgap, at all angles, with no absorptive loss. It is this property, together with that of selective spectral transmissivity within a stop band, which is of interest in terms of potential application.

The band gap itself can be designed to provide a broad (up to 30% of the centre frequency [4]) blocking filter, and the introduction of symmetry-breaking defects can give rise to a transmission window within the gap. This can be designed to be very narrow with respect to the width of the gap; the result is a narrow-band notch filter.

Another potential application is as a perfectly reflecting substrate for a dipole antenna, for which the photonic crystal acts as an efficient mirror, ensuring that the greater part of the emitted radiation generated is transmitted and not absorbed in the substrate. Early investigations have already demonstrated improved efficiency from such antennas [6]. Further applications are as lossless media for waveguides and cavity oscillators. A large number of further applications for these structures is revealed in ref. 5d.

The current invention employs the use of StereoLithography (SL) rapid prototyping. SL is one of a number of rapid prototyping technologies which can fabricate a large range of three-dimensional objects. The SL apparatus (SLA) can build in a few hours 3-dimensional macroscopic objects according to a computer file produced on a computer-aided design (CAD) workstation system.

The design is performed using proprietary 3-dimensional modelling CAD software. The software package includes a filter to output the CAD file into a .STL file (.STL being a standard suffix for file types used in rapid prototyping). The .STL file is then modified using proprietary software ("Bridgeworks") to include any support structures needed in the construction of the three-dimensional object. Finally, further proprietary software ("Maestro" supplied by 3D Systems—see below) computes appropriate parameters from the three-dimensional object to drive the SLA machine via an attached PC computer.

SUMMARY OF THE INVENTION

According to this invention, a method of manufacturing a dielectric medium having a periodic spatial distribution of two materials, said materials being so formed that discrete interfaces exist between them and having sufficiently different electrical permittivities that the dielectric medium provides a barrier to electromagnetic radiation for a range of frequencies, comprises the steps of:

forming a three dimensional structure, by selective local polymerisation of batch monomer, said structure comprising the lower electrical permittivity material of the dielectric medium and voids which correspond to the higher electrical permittivity material, and casting a higher permittivity material in said voids.

Preferably the three dimensional structure is formed by selective local photopolymerisation of batch monomer using a laser and, more preferably, the higher permittivity material comprises a higher permittivity powder in a curable host polymer.

According to a second aspect of the invention, a novel crystal has the structure Tapsterite as described herein.

BRIEF DESCRIPTION OF THE DRAWINGS

The invention will now be described, by example only, with reference to the following figures in which.

DETAILED DISCUSSION OF PREFERRED EMBODIMENTS

Figure 1:
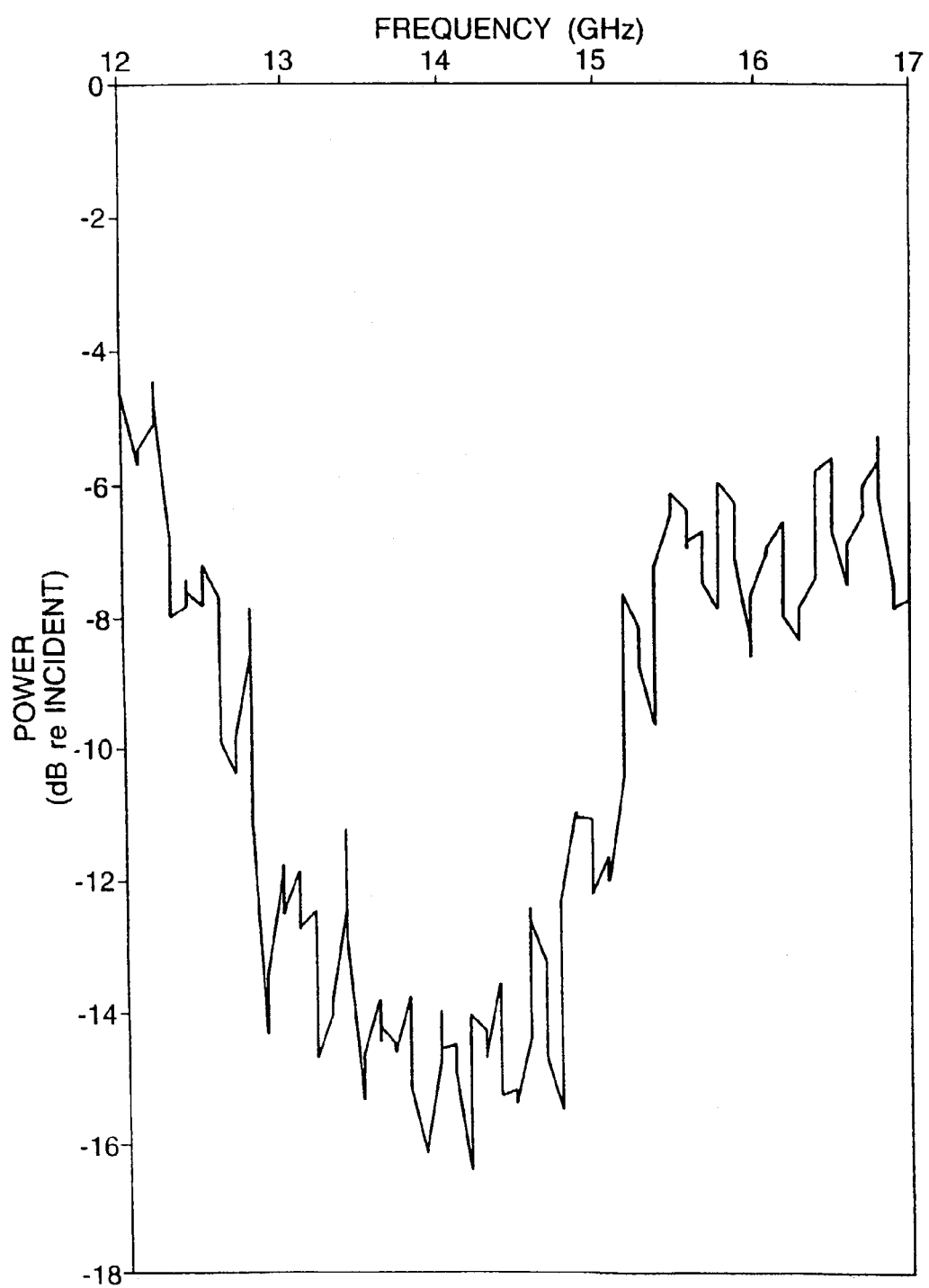
FIG. 1 shows performance data relating to the transmission properties of a first sample produced by the current invention.

The main manufacturer of SLA machines is 3D Systems of Valencia, Calif., USA. The SLA-250/40 machine used in the specific embodiment of this invention consists of an ultra-violet—(UV)-screened cabinet containing a 254 mm×254 mm×254 mm vat of SL-5170 liquid resin. The resin, manufactured by Ciba-Geigy (CIBATOOL® SL resin), is curable by exposure to ultraviolet light. The system includes a 25 mW HeCd laser, emitting at 325 nm.

An internal optical system directs the laser beam onto the surface of the resin, where the beam width is approximately 0.2 mm. The optical system scans the beam across the surface of the resin according to digital instructions relayed from an attached PC computer.

Local curing takes place at the surface of the resin. A complete scan of the surface selectively polymerises a layer of resin of thickness 0.125 mm on an elevator platform positioned just below the surface. After each layer scan the elevator platform is lowered into the resin vat and then raised to a position 0.125 mm below the surface of the liquid resin, ready for the next laser scan. The 3-dimensional structure is thus built up layer-by-layer to the desired height. At the end of the build the structure is raised from the vat and left to drain excess liquid resin from the structure.

The structure is then washed using iso-propyl alcohol (IPA), (i.e. propan-2-ol) or tri-propylene glycol monomethyl ether (TPM) to remove remaining excess liquid resin, and finally cured in a Post-Curing Apparatus (PCA), which bathes the washed object in ultraviolet light to cure any remaining uncured monomer.

The fabrication process employed in this programme comprises the following stages. First, the high permittivity structure is designed on a CAD platform, and converted into the negative structure. That is to say that high-permittivity regions become empty, and vice versa. The resulting file is then transformed to a format which can be read by a rapid prototyping machine (in this case the Stereolithography Apparatus, or SLA). The SLA grows the negative preform. The resulting object is a low-permittivity (epoxy resin) mould, in which can be vacuum-cast the high-permiittivity material. In practice, the inserted material comprises a high-permittivity powder loading a liquid resin. The SLA epoxy permittivity is low enough (relative dielectric constant of 3 for the Ciba-Geigy SL5170 resin at the microwave frequencies 2 to 30 GHz) for the dielectric medium to possess a high enough dielectric contrast for the formation of a full and absolute photonic band gap.

The method involves the initial fabrication of a periodic material out of SL polymer using the standard SL methods described above. This in practice involves the initial specification of the geometry of the relevant structural unit cell in CAD software. In this example the SL polymer is designated the low-permittivity component of the crystal.

Subsequent software manipulation defines the replication of the unit cell to produce the periodic structure. Further manipulation can modify the structure to define associated devices.

The structure or device is grown using standard SL techniques.

The empty interstices of the structure are filled with high-permittivity material to provide the necessary contrast. In practice this involves the preparation of a filler composed of a mixture of a high-permittivity, low-loss powder with a curable host polymer. The filler is introduced to the SL resin mould and injected under vacuum conditions, and subsequently allowed to harden.

A first sample was prepared by designing a cubic unit cell of side 9.86 mm on a Sun workstation using Aries 3-dimensional modelling CAD software, developed by MacNeal-Schwendler Corporation. A second sample was also prepared by designing a cuboid unit cell of sides 17.08 mm, 12.08 mm, and 6.97 mm on the same system used for design of the first sample. The structure used for both samples was the intersecting tetrahedron type to be described elsewhere. The filling fraction employed was designed to be 70% low-permittivity material to 30% high-permittivity material. The subsequently measured permittivities of the constituent materials was 3 and 12.5.

The two unit cell files in .STL format were transferred to a Silicon Graphics Indy workstation and replicated to give, in the first sample, a layer of 23×4 unit cubic unit cells and, in the second sample, a layer of 20×2 cuboid unit cells using the proprietary Maestro software (supplied by 3D Systems Inc.), and a grid of supports then added to the structure using the proprietary software Bridgeworks (supplied by Solid Concepts Inc. of Valencia, Calif., USA). The Maestro software was also used to compute parameters needed for the SLA machine to build the structure. This is an automatic "slicing" routine which computes the parameters of each slice of SL polymer from which the final object is built. The PC software outputs four "Build" files (named "vector", "range", "layer", and "parameter" files).

The files output from the workstation were then input to the PC computer connected to the SLA machine, and containing the System Control software 3D Build (supplied by 3D Systems Inc.), and the machine instructed to build the lower layer with associated supports, and subsequently identical layers, positioned vertically above each existing layer, but without the supports. The final structures produced were, for the first sample, 23 cubic unit cells in height, measuring approximately 227 mm.×227 mm.×40 mm and, for the second second sample, 34 cuboid unit cells in height, measuring approximately 242 mm×237 mm×34 mm.

The orientation of the first sample (corresponding to the cubic unit cell) was arranged so that the larger face represented the [100] direction of the crystal. The orientation of the second sample (corresponding to the cuboid unit cell) was arranged so that the largest face represented the [111] direction of the crystal.

The samples were then washed in TPM and cured in a Post-Curing Apparatus, as described above.

The high-permittivity filler selected for injection to the preform sample was calcium titanate. The polymer host was a low-viscosity vinyl ester system manufactured by Scott Bader, Derakane 8084 using Butanox LPT as catalyst.

The calcium titanate powder was mixed with the liquid resin filler to the level of 37% by volume. Gel time tests showed that 5% by weight of catalyst and 5% by weight of accelerator when added to the resin system gave a usable pot life of 30 minutes. A solid cured sample of the mixture was first taken and allowed to cure and then analysed with a dielectric probe, which registered a value of relative dielectric constant of 12.5 at a frequency of 10 GHz, with zero imaginary part to within the accuracy of the apparatus (an accuracy of ±0.1i); that is to say that the cured mixture displayed neglible loss at the measured frequency.

A vacuum cap with five-point extraction was produced for the injection of the samples. This cap was manufactured using glass fibre pre-impregnated with epoxy resin over a simple mould. British Standard pipe connections were subsequently added through holes drilled in the cap and connected via a vacuum trap to a vacuum pump. The resin tank used was constructed so that it was only slightly larger than the samples to be injected.

The vacuum pump was switched on and allowed to run until resin with no air bubbles was being drawn into the resin trap from the injected block. The tap on the connecting pipe was then closed and the vacuum pump switched off. Excess resin was then drawn off using a syringe to a level close to the top of the block. Once the resin had cured to a jelly-like consistency (approximately 30 minutes) the block was removed, excess resin scraped off and the vacuum cap removed. The resin was allowed to cure completely and the block. subsequently removed.

The transmission properties of the first sample fabricated in the manner described above were measured over a range of frequencies using Flann Microwave DP240 microwave broadband transmitter and receiver horns, positioned 60 cm on either side of the first sample, so that radiation passed through the first sample normal to its large face, in the [100] crystal direction.

The transmitted signals were generated by a Hewlett-Packard Vector Network Analyser 8720B, which produced a swept frequency from 2 to 20 GHz.

The transmitted signal was analysed by the same Network Analyser and displayed with measured values at 200 KHz intervals. A smoothed section of the transmission response is displayed in FIG 1. It shows a drop in the transmission of about 10 dB relative to the value at 12 GHz, and centred at about 14 GHz, which is the value predicted by numerical calculation. The width of the gap is about 3 GHz, which is about 20% of the centre frequency.

The transmission and reflection properties of the second sample fabricated in the manner described above were measured over a range of frequencies using microwave transmitter and receiver horns possessing a true Gaussian beam profile. (The inner circular surfaces of the horns were corrugated). The transmitter horn was positioned 0.5 m from a machine parabolic mirror, which reflected the incident radiation through 90° onto the [111] face of the second sample, placed 0.5 m from the mirror. Radiation transmitted through the second sample was reflected through 90° by a similar mirror onto a second identical receiver horn. Each horn was connected to a Wiltron 360 circuit analyser, in turn interfaced by a personal computer controller. The system used a 6737B synthesiser to generate a signal from 8.2 GHz to 18 GHz.

The transmitted and reflected signals were analysed by the same circuit analyser, and displayed at 200 KHz intervals. The transmission and reflection spectra were obtained over the frequency interval given using two different pairs of horns: one pair covered the region of 8.2 GHz to 12.4 GHz, and the second covered the range 12.4 GHz to 18 GHz.

Figure 2:
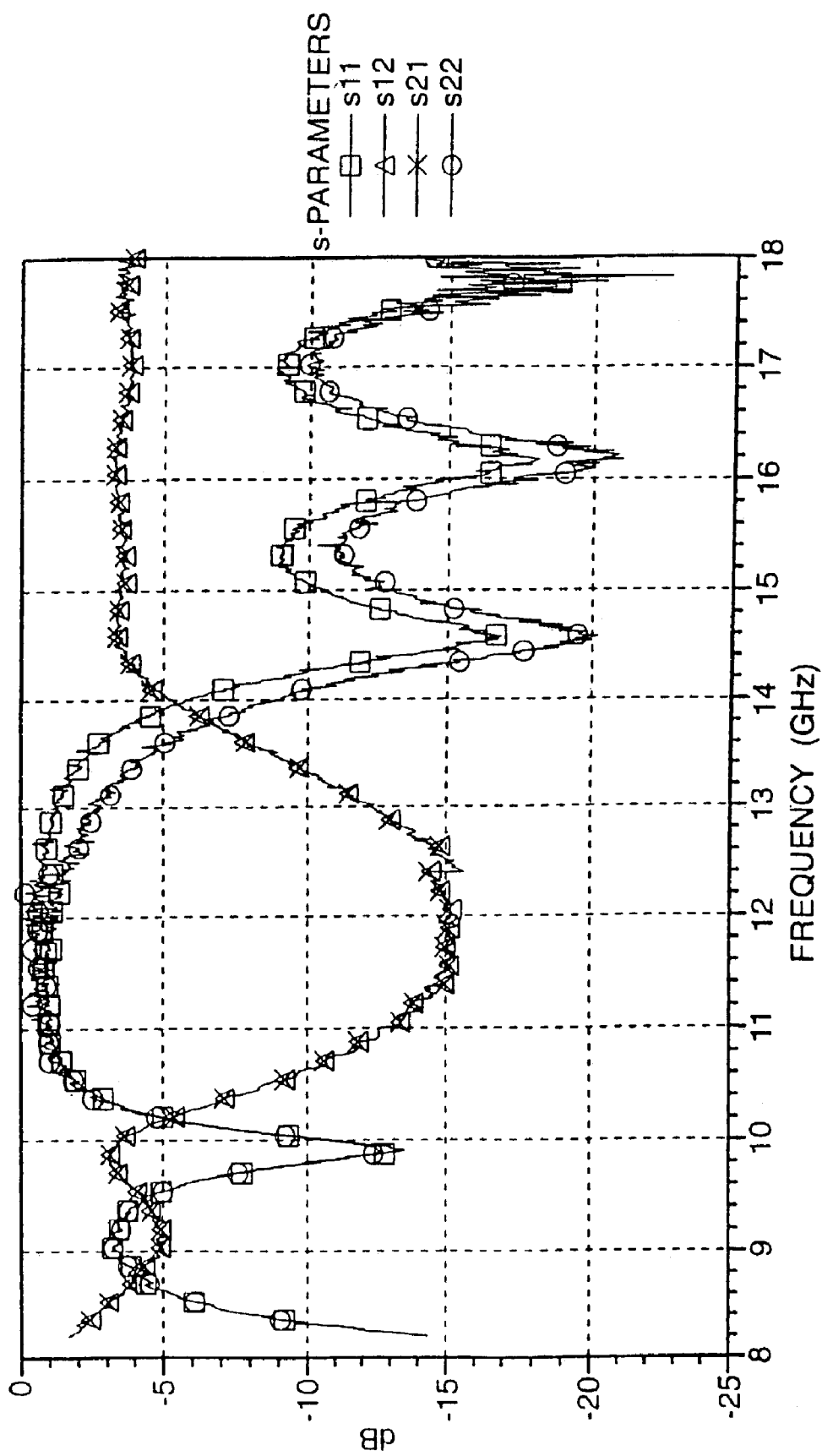
FIG. 2 shows performance data relating to the transmission and reflection properties of a second sample produced by the current invention.

The resulting spectra are shown in FIG. 2. The parameters $s_{11}$ and $s_{22}$ describe the reflection coefficients of the second sample for radiation incident on the two opposite [111] faces, and $s_{12}$ and $s_{21}$ represent the transmission coefficients for the corresponding faces. The transmission coefficients show a drop in the transmission of about 12 dB relative to the value at 15 GHz, and the drop is centred at about 12 GHz, which is the value predicted by numerical calculation. The width of the gap is about 4 GHz, which is roughly one third of the centre frequency. It is to be noted that the reflectivity $s_{22}$ of the second sample rises by nearly 20 dB in the band gap relative to its value at 14.5 GHz. The difference in reflectivities observed between the measurements represented by $s_{11}$ and $s_{22}$ indicates a small asymmetry in the second sample between the two faces possibly arising from slight imperfections (bubbles) in the high dielectric filler occupying a preferred position in the cavities being filled.

In addition to the 3- and 6-cylinder Yablonovite structures mentioned above, a further structure, composed of interlocking tetrahedra, was devised. The inventors have termed the structure "Tapsterite". It possesses the full diamond symmetry of 6-cylinder Yablonovite, and thus displays a wider band gap than the 3-cylinder Yablonovite, for the same dielectric contrast.

As it is a structure composed primarily of flat planes and straight edges, rather than curved surfaces, it does not lend itself to simple fabrication using standard machining methods. It is, however, ideal for the SL method, and for any method employing initial design on CAD equipment, since the Aries software stores surfaces as primitive planes, rather than curves: an .STL file describing 254 unit cells of 3-cylinder Yablonovite occupies a file size of 24.8 Mbytes; the same number of unit cells of 6-cylinder Yablonovite occupies 35 Mbytes (in this example each circular cylindrical hole comprised 40 planar facets); the same number of cells of Tapsterite occupies 9.1 Mbytes. Secondly, the SL build is faster, as the laser scanning of the resin is defined by straight lines.

Tapsterite has the property that its negative structure is also a form of Tapsterite (with, of course, the conjugate filling fraction).

The following is a geometrical description of the high-permittivity portion of the Tapsterite structure. The structure is composed of truncated tetrahedra. Each truncated tetrahedron is formed by the truncation of a regular tetrahedron (which is by its nature unique in shape). From each apex or corner of the tetrahedron is removed a smaller regular tetrahedron, three faces of which are defined by three faces of the original tetrahedron; these four tetrahedra are identical in size.

Figure 3:
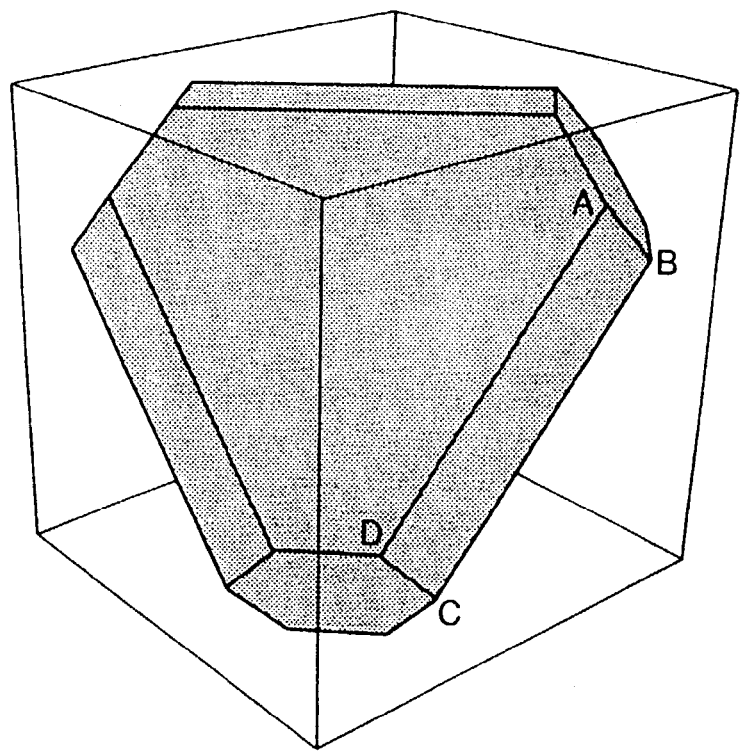
FIG. 3 shows a truncated tetrahedron from which a novel crystal structure is produced by the current invention.

The resulting object is further truncated by removal of the six edges (the lines of intersection of the faces of the original tetrahedron), with cuts along rectangular planes normal to the line drawn from the centre of the original tetrahedron to the mid-point of each edge. The position of this plane is such that the truncated apexes of the original tetrahedron now display a regular hexagonal plane. FIG. 3 shows such a fully-truncated tetrahedron: an example of one of the cut edges is the rectangle ABCD.

The truncation procedure is unique once the degree of truncation of each apex has been decided. The filling fraction for the constituent components of the final crystal is determined by this degree of truncation.

The crystal structure is defined by the concatenation of the truncated tetrahedra (TTs) in the following manner: the TTs are connected pairwise at each regular hexagonal truncation plane in such a way that a plane of the original tetrahedron of one TT is adjacent to a plane of a truncated edge of the contiguous TT.

Figure 4:
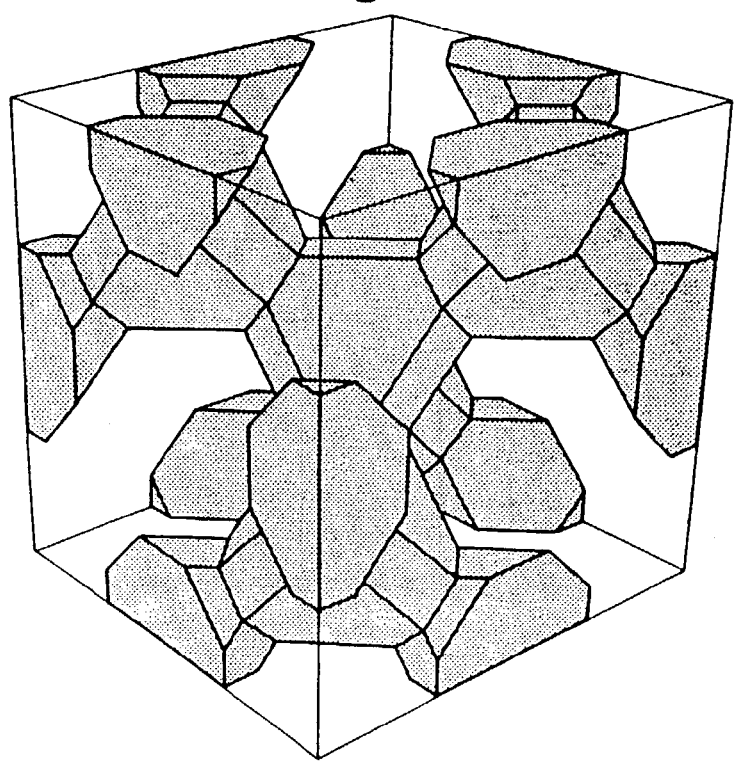
FIG. 4 depicts a first unit cell corresponding to the crystal structure produced by the invention.

The cubic unit cell for the crystal (and also used to generate the first sample, as described above) can be defined by any cube enclosing exactly 8 of the TTs (truncated if necessary) in the following specific orientation: the lines joining the centres of opposite rectangular faces on each TT are parallel to faces of the surrounding cube of the cubic cell. The contents of the cubic cell are defined up to an arbitrary linear translation in any direction. FIG. 4 shows an example of such a cubic unit cell, which contains 5 complete TTs and 12 quarter-TTs; here the centres of the quarter-TTs lie on the 12 mid-points of unit cell edges.

Figure 5:
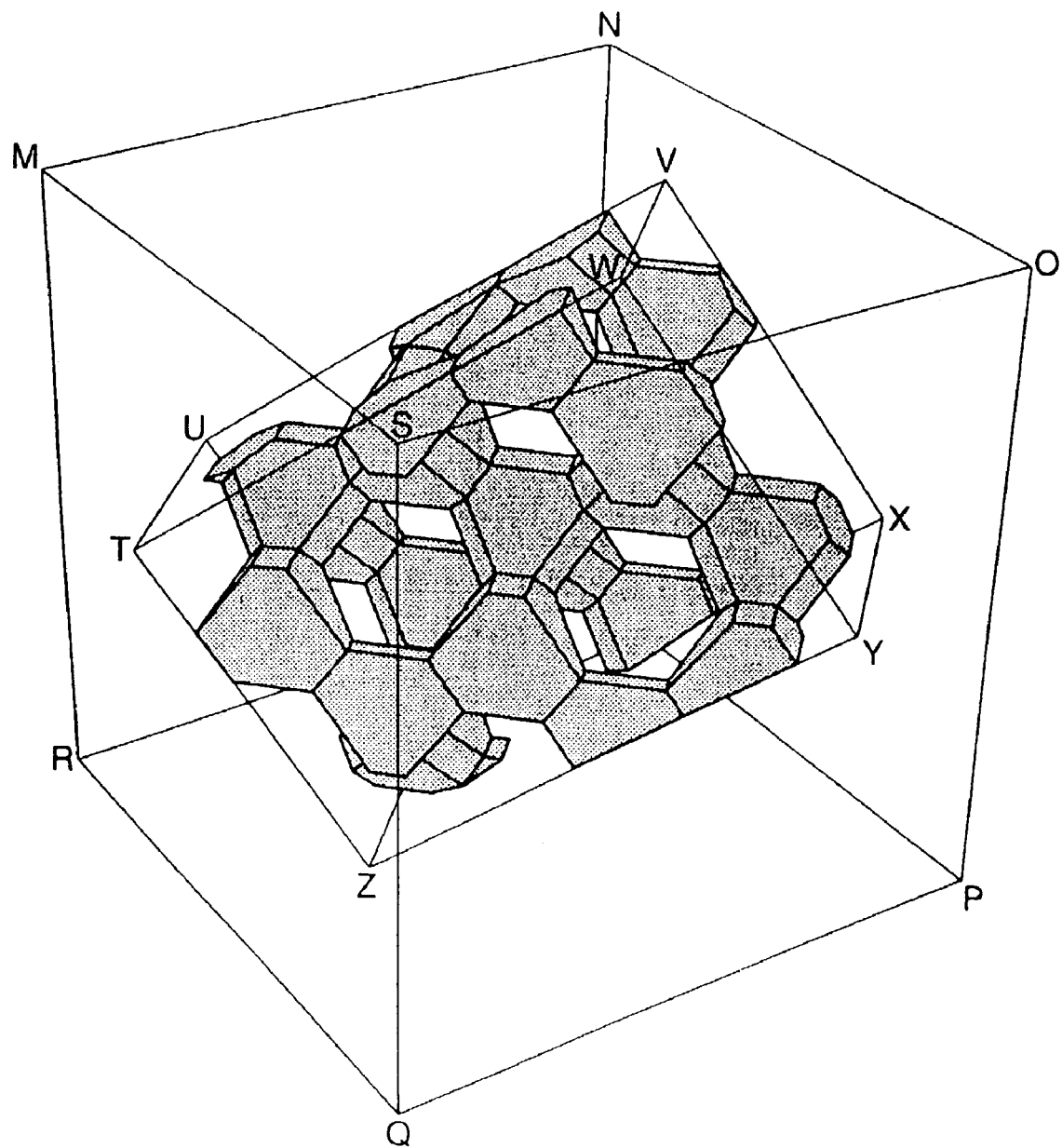
FIG. 5 depicts a second unit cell corresponding to the crystal structure produced by the invention.

The cuboid unit cell used to generate the second sample, as described above, is based upon an alternative orientation of the structure and is shown in FIG. 5. The cell constitutes a cuboid with (visible) vertices T, U, V, W, X, Y, Z. It is formed by excluding the material outside the cuboid described, and inside the surrounding cube shown, with (visible) vertices M, N, O, P, Q, R, S. The content of this latter cube (before exclusion) is defined as the content of eight cubic unit cells, as described in the previous paragraph, concatenated to form a larger cube. With reference to a coordinate system in which the origin of coordinates is at the centre of this larger cube, and the points (x, y, z) are described by the coordinates x, y, and z, with the origin at (0, 0, 0), then points M, N, O, P, Q, R, and S at vertices of the large cube can be described as being at the specific values (−1, −1, 1), (−1, 1, 1), (1, 1, 1), (1, 1, −1), (1, −1, −1), (−1, −1, −1), (−1, −1, 1), and (1, −1, 1), respectively. The internal cuboid then has (visible) vertices T, U, V, W, X, Y, Z having the specific values (−½, −1, 0), (−1, −½, 0), (0, ½, 1), (½, 0, 1), (½, 1, 0), (1, ½, 0), (0, −½, −1). The content of the cuboid is again defined up to a linear translation in any direction: the content of any such cuboid will serve as a unit cell which can be iterated to produce the fill crystal lattice with the desired orientation.

REFERENCES

1 YABLONOVITCH, E., Inhibited spontaneous emission in solid-state physics and electronics, Phys. Rev. Lett. 58, 2059, 1987.
2 JOHN, S. Strong localisation of photons in certain disordered dielectric superlattices, Phys. Rev. Lett. 58, 2486, 1987.
3 YABLONOVITCH, E., GMITTER, T. J., and LEUNG, K. M., MEADE, R. D., RAPPE, A. M., BROMMER, K. D., and JOANNOPOULOS, K. M, 3-dimensional photonic band structure, Opt. and Qu. Elect., 24, S273, 1992.
3a YABLONOVITCH, E., Optical Reflector Structure, Device, Method of Fabrication, and Communications Method, Int. Patent Classification G02B X, Int. Publication No. WO 92/11547, Jul. 9, 1992.
4a JOANNOPOULOS, J. D., MEADE, R. D., and WINN, J. N., Photonic Crystals: Molding the Flow of Light, (Princeton University Press, Princeton, N.J., 1995).
4b CHAN, C. T., HO, K. M., and SOUKOULIS, C. M., Photonic band gaps in experimentally realizable periodic dielectric structures, Europhys. Lett. 16, 563, 1991.
5 YABLONOVITCH, E., GMITTER, T. J., MEADE, R. D., RAPPE, A. M., BROMMER, K. D., and JOANNOPOULOS, J. D., Donor and acceptor modes in photonic band structure, Phys. Rev. Lett. 67, 3380, 1991.
5a OZBAY, E., TUTTLE, G., MICHEL, E., HO, K-M., BISWAS, R., CHAN, C-T. C., and SOUKOULIS, C., Periodic Dielectric Structure for Production of Photonic Band Gap and Method for Fabricating the Same, U.S. Pat. No. 5,406,573, Apr. 11, 1995.
5b HO, K-M, CHAN, C-T., and SOUKOULIS, C., Periodic Dielectric Structure for Production of Photonic Band Gap and Devices Incorporating the Same, U.S. Pat. No. 5,335,250, Aug. 2, 1994; Int. Patent No. H01S 3/18, Int. Publication No. WO 94/15389, Jul. 7, 1994.
5c HO, K-M., CHAN, C-T., SOUKOULIS, C. M., BISWAS, R., and SIGALAS, M., Photonic Band Gaps in Three Dimensions: New Layer-by-Layer Periodic Structures, Solid-State Communications, 89, (5), 413-416, 1994; OZBAY, E., MICHEL, E., TUTTLE, G., BISWAS, R., HO, K-M., BOSTAK, J., and BLOOM, D. M., Terahertz Spectoscopy of Three-dimensional Photonic Band-gap Crystals, Optics Letters, 19, (15), Aug. 1, 1994; OZBAY, E., MICHEL, E., TUTTLE, G., BISWAS, R., SIGALAS, M., and HO, K-M., Micromachined Millimeter-wave Photonic Band-gap Crystals, App. Phys. Letts. 64, (16), 2059, Apr. 18, 1994; OZBAY, E., MICHEL, E., TUTTLE, G., BISWAS, R., HO, K-M., BOSTAK, J., and BLOOM, D. M., Double-etch Geometry for Millimeter-wave Photonic Band-gap Crystals, Appl Phys. Lett. 65, (13), 1617, Sep. 26, 1994; OZBAY, E., ABEYTA, A., TUTTLE, G., TRINGIDES, M., BISWAS, R., CHAN, C-T., SOUKOULIS, C., and HO, K-M., Measurement of a Three-dimensional Photonic Band Gap in a Crystal Structure made of Dielectric Rods, Phys Rev. B50, (3), 1945, Jul. 15, 1994.

5d BROMMER, K., MULLANEY, H., MEADE, R., RAPPE, A., and JOANNOPOULOS, J., Low-Loss Dielectric Resonant Devices, Int. Patent Classification H01P 1/207, H01Q 15/00 G02B 5/18, 5/28, Int. Publication No. WO 92/15124, Sep. 3, 1992.

6 CHENG, S. D., BISWAS, R., OZBAY, E., McCALMONT, S., TUTTLE, G., and HO, K.-M., Optimized dipole antennas on photonic band gap crystals, Appl. Phys. Lett. 67, 3399, (1995).

7 LEUNG, K. M. and LIU, Y. F., Phys. Rev. Letts., 65, 3152, (1991); ZHANG, Z. and SATPATHY, S., ibid. 65, 2650 (1991); HO. M., CHAN, C-T., and SOUKOULIS, C. M., ibid. 65, 3152 (1991).

The invention claimed is:

1. A dielectric medium having a periodic spatial distribution of a lower permittivity material and of a higher permittivity material, said higher permittivity material having a permittivity greater than the permittivity of said lower permittivity material, said materials being so formed that discrete interfaces exist between them, said materials having sufficiently different electrical permittivities that the dielectric medium provides a barrier to electromagnetic radiation for a desired frequency range, the structure of the higher permittivity material being in the form of concatenated polyhedrons.

2. A dielectric medium according to claim 1, wherein each polyhedron is a truncated tetrahedron formed by the removal of at least one edge and/or at least one apex.

3. A dielectric medium according to claim 2, wherein each apex is removed.

4. A dielectric medium according to claim 3, wherein each edge is removed and each truncation plane formed by the removal of the corresponding apex, is a regular hexagon.

5. A dielectric medium according to claim 4, wherein the truncated tetrahedra are connected pairwise at each hexagonal truncated apex in such a way that the plane of the original tetrahedron of one truncated tetrahedron is adjacent to a plane of a truncated edge of the contiguous truncated tetrahedron.

6. A dielectric medium having a periodic spatial distribution of a lower permittivity material and a higher permittivity material, said higher permittivity material having a permittivity greater than the permittivity of said lower permittivity material, said materials being so formed that discrete interfaces exist between them, said materials having sufficiently different electrical permittivities that the dielectric medium provides a barrier to electromagnetic radiation for a desired frequency range, the lower permittivity material comprising a polymer formed by photopolymerisation.

7. A dielectric medium according to claim 6, wherein the higher permittivity material comprises a mixture of a higher permittivity powder and a host polymer.

8. A dielectric medium according to claim 7, wherein the higher permittivity powder comprises calcium titanate.

9. A dielectric medium according to claim 7, wherein the host polymer is a vinyl ester polymer.

10. A narrow band notch filter incorporating a dielectric medium as claimed in claim 1.

11. A dipole antenna incorporating a dielectric medium as claimed in claim 1.

12. A waveguide incorporating a dielectric medium as claimed in claim 1.

* * * * *